United States Patent Office 3,278,551
Patented Oct. 11, 1966

3,278,551
DYESTUFFS
Helmut Kleiner, Cologne-Stammheim, and Alfred Brack and Harald Gleinig, Leverkusen, Germany, assignors to Farbenfabriken Bayer Aktiengesellschaft, Leverkusen, Germany, a corporation of Germany
No Drawing. Filed Mar. 13, 1964, Ser. No. 351,825
Claims priority, application Germany, Apr. 20, 1963, F 39,525
8 Claims. (Cl. 260—326.5)

The invention is concerned with valuable new dyestuffs; more particularly it relates to new dyestuffs which are free from sulphonic acid and carboxylic acid groups, of the formula

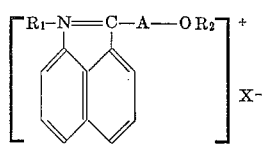

(I)

In this formula $R_1$ means hydrogen or an alkyl, cycloalkyl, aryl or aralkyl radical, $R_2$ means an alkyl, cycloalkyl, aryl or aralkyl radical, and A an aromatic radical; X stands for an anion used in basic dyestuffs; the radicals $R_1$, $R_2$, A and the naphthalene nucleus may contain further non-ionic substituents.

The new dyestuffs may be obtained by heating naphtholactam-(1,8) of the formula

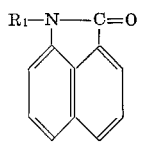

(II)

wherein $R_1$ has the meaning indicated above, and $R_1$ and the naphthalene ring may contain further non-ionic substituents, with compounds A—$OR_2$, wherein A and $R_2$ have the above meaning, in the presence of condensating agents which split off water.

Naphtholactams suitable for the process are, among others, naphtholactam-(1,8), N-methyl-, N-ethyl-, N-propyl-, N-butyl-, N-amyl-, N-phenyl-, N-benzyl-, N-phenylethyl- and N-cyclohexyl naphtholactam-(1,8), and further substituted products thereof, for example, N-β-methoxyethyl-, N-γ-methoxypropyl-, N-β-chloroethyl- and N-γ-chloropropyl-naphtholactam-(1,8), 4-chloro-, 4-bromo- and 4-iodo-naphtholactam-(1,8), N-methyl-4-chloro- or 4-bromo or 4-iodo-naphtholactam-(1,8) 4-nitro- or 4-methoxy-, 4-acetylamino-, 4-dimethylamino-, 4-sulphodimethylamino-naphtholactam-(1,8), N-methyl-4-nitro- or -4-methoxy, -4-acetylamino, -4-dimethylamino- or -4-sulphodimethylamino-naphtholactam-(1,8).

Naphtholactam-(1,8) can be obtained from 8-amino-1-naphthoic acid by splitting off water, or from naphthalimide with NaOCl or from 1-cyano-naphthalene-8-sulphonic acid by potassium melt, or from 1-naphthyl-isocyanate with the aid of Friedel-Crafts catalysts. The aforesaid N-substitution products are readily obtained either by reacting the sodium salt of the naphtholactam with alkyl-, aralkyl- or cycloalkyl halides in alcoholic solution, or by ring closure of N-substituted carbamic acid chlorides with the aid of Friedel-Crafts catalysts.

As aromatic ethers $AOR_2$ which are suitable for the present process, there may be mentioned, among others:

Methoxybenzene, 1-methoxy-3-chlorobenzene, 1-methoxy-3-methylbenzene, ethoxybenzene, 1-ethoxy-3-chlorobenzene, 1-ethoxy-3-methylbenzene, 1,3-dimethoxybenzene, 1,3-diethoxy, 1,3-dipropoxy- and 1,3-dibutoxybenzene, 1,3-di-β-cyanoethoxybenzene (obtained by adding acrylonitrile on 1,3-dihydroxybenzene), 1,3-di-β-carbomethoxy-ethoxy-benzene (obtained by adding acrylic acid methyl ester on 1,3-dihydroxy-benzene), 1,3,5-trimethoxy- or -triethoxy- or -tripropoxy- or -tributoxybenzene, 1,2,4-trimethoxy- or -triethoxy- or -tripropoxy- or -tributoxybenzene, 2,4-dimethoxy-1-methylbenzene and the corresponding diethoxy-, dipropoxy- and dibutoxy compounds, 1,3-dimethoxynaphthalene and the corresponding diethoxy-, dipropoxy- and dibutoxy compounds, 2-methoxynaphthalene and the corresponding higher alkoxy compounds, and diphenyl ethers.

Etherification of the phenols or naphthols can usually be carried out smoothly with alkyl-sulphuric acid esters; however, when etherifying particularly reactive polyhydroxy benzenes, for example phloroglucinol, it is advisable first to produce the monoether, for example with the aid of alcohol/hydrochloric acid, and then to carry out further alkylation with alkyl-sulphuric acid ester.

As water-eliminating condensing agents suitable for carrying out the process according to the invention the customary compounds may be employed, for example, phosphorus halides, such as $POCl_3$, $POBr_3$, $PCl_3$, $PCl_5$, furthermore phosgene, thionyl chloride, sulphuryl chloride, tin tetrachloride, titanium tetrachloride, aluminium chloride, zinc chloride, boron trifluoride and silicon tetrachloride.

The process can be carried out in such a manner that the initial components are heated in stoichiometric proportions or with an excess of one or the other reaction component, in the presence of water-eliminating agents; but it is also possible to heat the initial component in a suitable diluent, preferably at the boiling temperature of the diluent, generally in the range between 40 and 130° C., in the presence of a water-eliminating condensing agent. According to another alternative method the condensing agent is first allowed to act upon the naphtholactam compound and the aromatic ether compound is then added. In general, the reaction products begin to separate at the very start of the reaction: in all the above-mentioned processes the reaction is completed after a short time, generally after a few hours.

The reaction products obtained separate in the form of their dyestuff salts. These may be used as such for further purposes or, in case the process was started with N-unsubstituted naphtholactam-(1,8), they may be transformed into the corresponding dyestuff bases by the action of alkalis and then be quaternized by means of quaternizing agents.

As diluents for one method of carrying out the process there may be considered among others: benzene as well as chlorozenzene, nitrobenzene, chloroform and other chloroalkanes.

The dyestuffs obtained according to the present invention are particularly suitable for the dyeing and printing of fibres or fabrics of polymers of acrylonitrile or 1,1-dicyano-ethylene or of copolymers containing a predominant proportion of these components. Dyeings with good to very good fastness properties, especially very good fastness to light and wet processing, are obtained.

The type of the anion X usual in basic dyestuffs does not affect the dyeing properties of the novel dyestuffs. From their preparation the dyestuffs will normally exhibit anions like halide anions, in particular $Cl^-$ and/or $Br^-$ or sulfonate groups, such as $-OSO_3CH_3^-$ or $-OSO_3C_2H_5^-$ or p-toluene sulfonate; in general, the nature of the anion depends on the mode of production, purification and/or precipitation of the dyestuff. The anion can, however, be replaced by other anions normally encountered in dyestuff salts of basic dyestuffs by methods known as such; for this purpose the dyestuff salt is first converted into the free base by neutralizing it with a basic reagent, such as sodium carbonate, sodium hydroxide and the like, and when this base is then converted into the form of the desired salt with the corresponding organic or inorganic acid by means of this procedure, it is possible to obtain dyestuff salts which contain for example [BF$_4$]$^-$, benzene sulfonate, phosphate, acetate, chloro zincate, perchlorate, NO$_2$$^-$, sulfate, oxalate, formate, citrate, maleinate, tartra benzoate, lactate, propionate, butyrate or succinate radicals as the anions.

The following examples are given for the purpose of illustrating the invention. The parts given therein stand for parts by weight, unless stated otherwise.

*Example 1*

16.9 parts of naphtholactam-(1,8) are dissolved together with 14 parts of 1,3-dimethoxybenzene in 200 parts by volume of chlorobenzene and 17 parts of phosphorus oxychloride are added dropwise while stirring at 100° C. The solution quickly acquires a reddish brown colour; the dyestuff formed begins to separate. After a few hours the mixture is allowed to cool and the reaction product is filtered off with suction. It corresponds to the formula

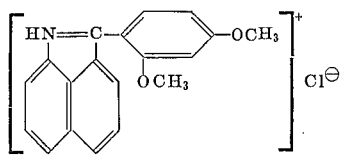

For purification it is dissolved in hot water, any dirt present is filtered off and the product is precipitated with zinc chloride. After filtering with suction and drying about 16 parts of a red-brown dyestuff powder are obtained which dyes polyacrylonitrile fibres in reddish orange shades of good fastness to washing and light.

In accordance with the method given in this example the following dyestuffs can be prepared which dye polyacrylics in the shades indicated below:

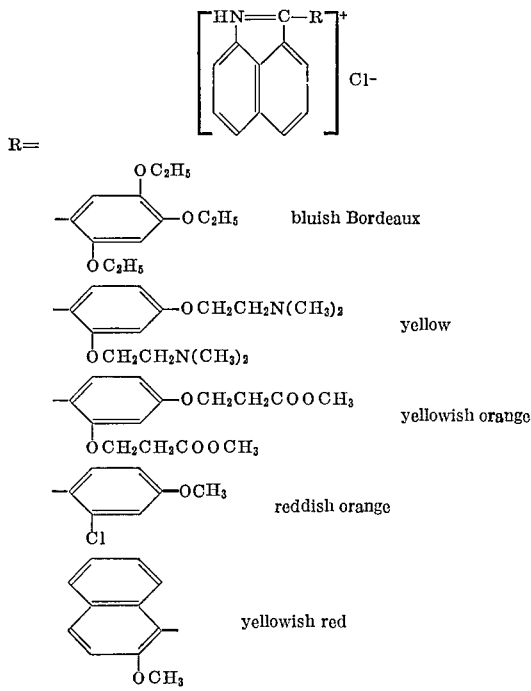

*Example 2*

8 parts of the dyestuff obtained according to Example 1 are dissolved in hot water. The free base is precipitated with dilute ammonia, then filtered off with suction, dried and dissolved in about 300 parts by volume of chlorobenzene at 100° C. To this are added dropwise, while stirring, 3.5 parts of dimethyl sulphate dissolved in 20 parts by volume of chlorobenzene, whereupon the quaternary salt gradually separates. The mixture is maintained at 100° C. for about one hour, is allowed to cool and the dyestuff formed of the formula

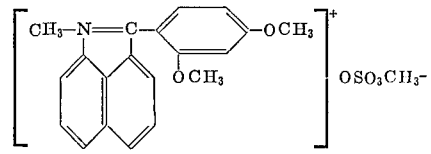

is filtered off with suction.

For purification the dyestuff is dissolved in hot water, in which it readily dissolves with a reddish brown colour, it is then precipitated with zinc chloride solution. After isolating and drying, about 7 parts of a reddish brown dyestuff power are obtained which dyes polyacrylonitrile fibres in orange shades fast to light and washing.

*Example 3*

18.3 parts of N-methyl-naphtholactam-(1,8) are melted with 17 parts of 1,3-diethoxy benzene at 50° C. 17 parts of phosphorus oxychloride are added dropwise to the melt with occasional cooling. After 10 hours the mixture is allowed to cool and the reaction product is placed into 1000 parts by volume of boiling water, some animal charcoal is added and the mixture is filtered. From the filtrate the dyestuff double salt is precipitated with zinc chloride. About 22 parts of an initially soft and gradually solidifying dyestuff are obtained, which may be re-dissolved in hot water. It dyes tanned cotton, but especially fibres or fabrics of polymers or copolymers containing predominantly polyacrylonitrile in reddish orange shades of good fastness to washing and light.

If instead of N-methyl-naphtholactam-(1,8), the N-ethyl-naphtholactam-(1,8) is used, a dyestuff of similar shades and equally good fastness properties is obtained.

The following dyestuffs can likewise be prepared according to the method given in this example using the appropriate starting materials; the dystuffs obtained dye polyacrylics in the shades listed below:

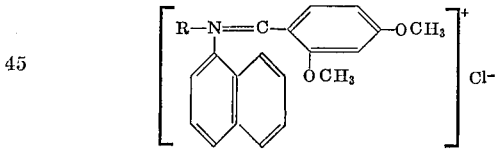

R=
$CH_3CH_2CH_2-$ yellowish orange
$C_4H_9-$ yellowish orange
$C_5H_{11}-$ yellowish orange
$C_6H_5-$ reddish orange
$C_6H_5CH_2-$ orange
$C_6H_5CH_2CH_2-$ orange
phenyl orange
$CH_3OCH_2CH_2-$ orange
$CH_3OCH_2CH_2CH_2-$ orange

*Example 4*

16.9 parts of naphtholactam-(1,8) and 10.8 parts of methoxy benzene are dissolved in 200 parts by volume of chlorobenzene at 100° C. and 17 parts of phosphorus oxychloride are added dropwise, while stirring. The solution becomes yellow-brown, and the dyestuff formed separates gradually. Heating and stirring is continued for some hours and, after cooling, the dyestuff is isolated by filtering with suction. It dissolves in water with a red-orange colour. In order to liberate the free base, the product is stirred with a dilute sodium carbonate solution. Quaternisation can be carried out in the following manner.

5 parts of the dyestuff base are dissolved in 400 parts by volume of dioxan and 2.7 parts of dimethyl sulphate dissolved in 20 parts by volume of dioxan are gradually added at 100° C. After 1–2 hours the quaternary dyestuff salt is filtered off with suction and purified by redissolving in water and precipitating with zinc chloride.

About 4 parts of a red-brown water-soluble powder are obtained, which dyes polyacrylonitrile fibers in strongly reddish orange shades fast to washing and light.

*Example 5*

16.9 parts of naphtholactam-(1,8), 17 parts of diphenyl ether are dissolved in 400 parts by volume of chlorobenzene at 100° C. and 17 parts of phosphorus oxychloride are gradually added at this temperature, while stirring. After stirring for 2 hours at 100° C. the precipitated dyestuff salt is filtered off with suction. It dissolves, though not readily, in hot water with a red-orange colour. Quaternisation is carried out in dioxan; for this the dyestuff base liberated from the dyestuff salt is dissolved in approximately the fiftyfold amount of dioxan at 100° C. and a little more than the calculated amount of dimethyl sulphate is added dropwise while stirring. The precipitated quaternary salt is a red-brown powder which dyes polyacrylonitrile fibers in reddish orange shades, very fast to washing and light.

*Example 6*

18.3 parts of N-methyl-naphtholactam-(1,8) and 12.2 parts of 1-methoxy-3-methyl benzene are melted at 50° C. and 17 parts of phosphorus oxychloride are added dropwise at this temperature. The quaternary dyestuff salt formed is dissolved in hot water, filtered with the addition of a little animal charcoal and brought to crystallisation by cooling. Optionally it may be purified by re-crystallisation. The dyestuff draws on fibers or fabrics of polyacrylonitrile in scarlet red shades of very good fastness to washing and light.

*Example 7*

16.9 parts of naphtholactam-(1,8) are dissolved with 16.8 parts of phloroglucinol trimethyl ether in 200 parts by volume of chlorobenzene and 17 parts of $POCl_3$ are added dropwise at 100° C. After 15 minutes a thick red-brown paste is formed which becomes thinner as stirring is continued. After one hour the heating is turned off and stirring is continued at room temperature for 4 hours. The crystalline precipitate is filtered off with suction and washed with benzene and petroleum ether.

For purifying the dyestuff-chlorohydrate it is dissolved in 1500 parts by volume of boiling water, some animal charcoal is added and small quantities of impurities are filtered off. After the addition of a little sodium chloride the dyestuff crystallises in the form of its chlorohydrate when cooling, it is then filtered off with suction and dried. 35 parts of a red-brown powder are obtained which is readily water-soluble. The dyestuff dyes polyacrylonitrile fibers in strong red-orange shades of excellent fastness to washing and light.

*Example 8*

12 parts of the dyestuff base obtained by treating the dyestuff salt of Example 7 with ammonia are dissolved in 300 parts by volume of chlorobenzene, and 5.7 parts of dimethyl sulphate are added dropwise at 50° C. After 1½ hours he mixture is allowed to cool to room temperature and is then stirred at this temperature for another 5 hours. The quaternary salt is then filtered off with suction and dried. 12 parts of an orange-brown powder are obtained which readily dissolve in water with an orange-yellow colour. Polyacrylonitrile fibers are dyed in orange shades, very fast to washing and light.

*Example 9*

13.8 parts of N-ethyl-4-bromo-naphtholactam-(1,8) are melted with 8.5 parts of 1,3-dimethoxybenzene at 70° C. and 8.5 parts of phosphorus oxychloride are added slowly at this temperature. After stirring for 24 hours at 70° C. the mixture is allowed to cool to room temperature. The melt is then boiled with water with the addition of some acetic acid and a little animal charcoal; it is filtered and allowed to crystallise. 10 parts of a dyestuff are obtained, which dyes polyacrylonitrile fibers in yellowish red shades of good fastness to light and washing.

If in this example N-ethyl-4-bromonaphtholactam-(1,8) is replaced by the equivalent amount of the corresponding chloro or iodo derivative dyestuffs with similar dyeing properties are obtained.

*Example 10*

8.5 g. of $POCl_3$ are added dropwise at 100° C. to 8.5 parts of naphtholactam-(1,8) and 10 parts of 1,3-dimethoxy-naphthalene in 100 ml. of chlorobenzene and the mixture is stirred for 5 hours at 100° C. The dyestuff formed is filtered off with suction, washed with benzene and dried. From an acetic acid bath it dyes polyacrylonitrile fibres in strong bluish violet shades. In order to prepare a quaternary dyestuff salt the dyestuff is treated in aqueous suspension with ammonia, the dyestuff base is filtered off with suction and dried.

3 parts of the dyestuff base are dissolved in 100 parts by volume of chlorobenzene at 100° C. and heated with 1 part of dimethyl sulphate for one hour. The precipitated quaternary dyestuff is separated, washed with benzene and petroleum ether and dried. It is soluble in hot water with a violet colour. The dyestuff dyes polyacrylonitrile in violet shades, fast to washing and light.

*Example 11*

8.5 parts of $POCl_3$ are added dropwise at 100° C. to 8.5 parts of naphtholactam-(1,8) and 8.4 parts of 1,2,4-trimethoxybenzene in 50 ml. of chlorobenzene. After about 10 minutes the dyestuff separates in a crystalline form. It is filtered off with suction, washed with benzene and petroleum ether and dried. It may be re-dissolved in water with animal charcoal and re-precipitated with a zinc chloride solution. About 16 parts of a dyestuff are obtained which dyes polyacrylonitrile fibres in bluish red shades.

For conversion into the dyestuff base the 16 parts are dissolved in 500 parts by volume of water and precipitated with ammonia. The dyestuff base (10 g.) is filtered off and dried and dissolved in 250 parts by volume of chlorobenzene at 100° C. and 4.8 parts of dimethyl sulphate are added to it. The quaternary dyestuff salt crystallises after 10 minutes; it is filtered off with suction, washed with benzene and dried. The yield amounts to about 16 parts. The dyestuff produces on polyacrylonitrile fibres bluish bordo shades of very good fastness to light and washing.

*Example 12*

8.5 parts of naphtholactam-(1,8) and 11 parts of 1,3-di-β-cyanoethoxy benzene in 50 ml. of chlorobenzene are mixed dropwise at 70° C. with 8.5 parts of $POCl_3$. The precipitated oily dyestuff salt is separated, taken up in hot water and precipitated with ammonia. The dyestuff base is separated and dried at 50° C. under reduced pressure. For quaternisation 5 parts of this base are dissolved in 250 parts by volume of chlorobenzene and 2 parts of dimethyl sulphate are added. After heating for 3 hours at 100° C. the precipitated resinous salt is separated and intensively mixed with petroleum ether. For purification it is dissolved in hot water, filtered with the addition of animal charcoal and separated with zinc chloride. The dyestuff obtained dyes fibres and fabrics of polyacrylonitrile in yellowish orange shades of good fastness to washing and light.

We claim:
1. A dyestuff of the formula

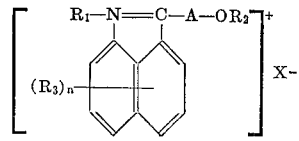

the cationic portion of which contains no free carboxylic or sulfonic acid groups, wherein $R_1$ stands for a member selected from the class consisting of hydrogen, lower alkyl, lower alkoxy substituted lower alkyl, chloro substituted lower alkyl, benzyl, phenylethyl and cyclohexyl, A stands for a divalent aromatic radical derived from substituted or unsubstituted benzene or naphthalene, the substituent groups being selected from the group consisting of lower alkyl, lower alkoxy, chloro, carbo-lower alkoxy-lower alkoxy, cyano-lower alkoxy, and phenoxy, $R_2$ stands for a member taken from the class consisting of lower alkyl, cyano substituted lower alkyl, carbo lower alkoxy substituted lower alkyl, di-lower alkylamino substituted lower alkyl and phenyl, $R_3$ stands for a member selected from the class consisting of hydrogen, chloro, bromo, iodo, lower alkyl, nitro lower alkoxy, acetylamino, di-lower alkyl substituted amino and di-lower alkyl sulfonamido, $n$ stands for an integer ranging from 1 to 2 and X sands for an anion used in basic dyestuffs.

2. A dyestuff of claim 1 wherein A is a phenylene radical in which the naphtholactam moiety and the group —$OR_2$ are placed in p-position to each other.

3. A dyestuff of claim 1 wherein A is a phenylene radical in which the naphtholactam moiety and the group —$OR_2$ are placed in p-position to each other and which contains at least one further substituent selected from the class consisting of methoxy, ethoxy, methyl, cyano ethoxy, chloro, bromo and dimethylamino.

4. The dyestuff of the formula

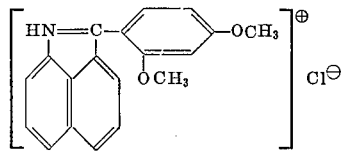

5. The dyestuff of the formula

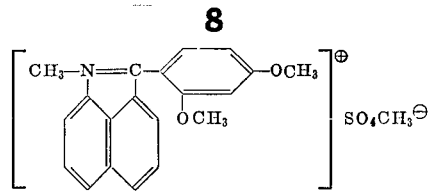

6. The dyestuff of the formula

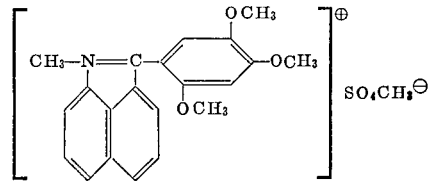

7. The dyestuff of the formula

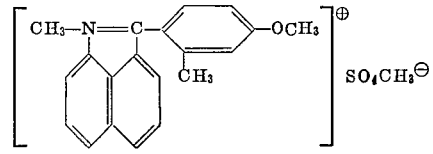

8. The dyestuff of the formula

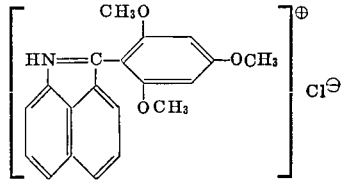

No references cited.

ALEX MAZEL, *Primary Examiner.*

JOSEPH A. NARCAVAGE, *Assistant Examiner.*